United States Patent
Arletti et al.

(10) Patent No.: US 9,920,144 B2
(45) Date of Patent: Mar. 20, 2018

(54) MAGNESIUM DICHLORIDE-ETHANOL ADDUCTS AND CATALYST COMPONENTS OBTAINED THEREFROM

(71) Applicants: BASELL POLIOLEFINE ITALIA S.R.L., Milan (IT); Brandon N. Hudder, Houston, TX (US)

(72) Inventors: Arrigo Arletti, Ferrara (IT); Lucia Caiazzo, Ferrara (IT); Gianni Collina, Ferrara (IT); Daniele Evangelisti, Ferrara (IT); Ofelia Fusco, Ferrara (IT); Benedetta Gaddi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/507,998

(22) PCT Filed: Aug. 20, 2015

(86) PCT No.: PCT/EP2015/069161
§ 371 (c)(1),
(2) Date: Mar. 1, 2017

(87) PCT Pub. No.: WO2016/034427
PCT Pub. Date: Mar. 10, 2016

(65) Prior Publication Data
US 2017/0283529 A1 Oct. 5, 2017

(30) Foreign Application Priority Data

Sep. 1, 2014 (EP) .................................. 14182999

(51) Int. Cl.
*C08F 110/06* (2006.01)
(52) U.S. Cl.
CPC .................................. *C08F 110/06* (2013.01)
(58) Field of Classification Search
None
See application file for complete search history.

(56) References Cited

FOREIGN PATENT DOCUMENTS

EP        0097131 A1   12/1983
WO   WO-2012084735 A1    6/2012

OTHER PUBLICATIONS

PCT International Search Report and Written Opinion dated Nov. 11, 2015 (Nov. 11, 2015) for Corresponding PCT/EP2015/069161.

*Primary Examiner* — Catherine S Branch

(57) ABSTRACT

The present disclosure relates to a porous solid adduct comprising magnesium chloride and ethanol, characterized by a relationship between the content of alcohol, average pore radius and amount of porosity deriving from pores with radii of 100-1000 nm, and catalyst components produced therefrom that are capable of producing polyolefins with increased porosity.

15 Claims, No Drawings

MAGNESIUM DICHLORIDE-ETHANOL ADDUCTS AND CATALYST COMPONENTS OBTAINED THEREFROM

This application is the U.S. National Phase of PCT International Application PCT/EP2015/069161, filed Aug. 20, 2015, claiming benefit of priority to European Patent Application No. 14182999.4, filed Sep. 1, 2014, the contents of which are incorporated herein by reference in its entirety.

FIELD OF THE PRESENT DISCLOSURE

The present disclosure relates to the field of chemistry. In some embodiments, the present disclosure relates to magnesium dichloride/ethanol adducts, which are characterized by particular chemical and physical properties. The disclosed adducts are useful as precursors of catalyst components for the polymerization of olefins.

BACKGROUND OF THE INVENTION

One of the most important families of propylene polymers comprises heterophasic copolymer compositions made of a high crystallinity propylene polymer fraction and a low crystallinity elastomeric component (for instance, a propylene-ethylene copolymer).

These compositions may be prepared by mechanical blending of the two main polymeric components, and may further be prepared via the sequential polymerization technique where the relatively high crystalline propylene polymer (sometimes called the crystalline matrix) is prepared in a first polymerization reactor and then transferred to a second polymerization reactor, where the low crystallinity elastomeric component is formed.

In this type of process, the porosity of the relatively high crystallinity polymer matrix may affect the incorporation of the elastomeric fraction into the crystalline matrix.

As a general rule, the higher the porosity of the polymer matrix produced in the first step, the higher is the amount of the resulting elastomeric component that can be incorporated within the matrix in the second polymerization step.

If the porosity of the matrix is poor, the presence of an excessive amount of elastomeric polymer fraction on the particles surface may considerably increase the tackiness of the particles, which gives raise to agglomeration phenomena causing reactor problems such as reactor wall sheeting, plugging and clogging.

A macroscopic measurement of the polymer porosity may be obtained by the polymer bulk density. The bulk density or apparent density is the mass per unit of volume of a material, including voids inherent in the material. In the case of polymer particles of a regular morphology, relatively low values of bulk density indicate a relatively high porosity of the polymer powder. It would therefore be useful to produce a propylene polymer endowed with both higher porosity (lower bulk density) and high crystallinity in the first polymerization step.

One option for producing crystalline polymers with a defined level of porosity is to polymerize propylene with a catalyst having a defined porosity.

As disclosed in EP Pat. Doc. 395083, a catalyst having defined porosity can be obtained using adducts of the general formula $MgCl_2 \cdot mEtOH \cdot nH_2O$, where m is between 1 and 6 and n is between 0.01 and 0.6, from which a certain amount of alcohol is removed, thereby creating a porous precursor which is then converted into a catalyst component by reaction with a titanium compound containing at least one Ti—Cl bond.

As a drawback, an increase in catalyst porosity may lead to a corresponding decrease in catalyst polymerization activity.

The present disclosure describes new $MgCl_2 \cdot mEtOH \cdot nH_2O$ adducts having specific chemical and physical properties useful as precursors for catalyst components able to generate polymers comprising lower bulk density without exhibiting a reduction in polymerization activity.

SUMMARY OF THE INVENTION

In some embodiments, the present disclosures provides for a solid catalyst precursor comprising magnesium chloride and ethanol comprising:
- a total mercury porosity deriving from pores with radiuses up to 1000 nm of at least 0.15 $cm^3/g$;
- an average pore radius (APR) determined by a mercury porosimeter ranging from 20.0-300.0 nm;
- a fraction of porosity deriving from pores with radiuses ranging from 100-1000 nm (LRP: Large Radius Porosity) of at least 25% with respect to total porosity; and
- a value of the formula (APR/wt % EtOH)*LRP higher than 50.0 when the APR is lower than 100 nm, and higher than 210 when the APR is higher than 100 nm.

DETAILED DESCRIPTION OF THE INVENTION

In one embodiment of the present disclosure, the total mercury porosity of the adduct ranges from 0.15-0.6 $cm^3/g$, including from 0.18-0.5 and from 0.2-0.4 $cm^3/g$.

In further embodiments, the average pore radius (APR) ranges from 50.0-250.0, including from 80-250.0 nm.

In certain embodiments, the LRP fraction is at least 30%, at least 40% and from 50-90% of the total porosity.

In some embodiments, when the APR is lower than 100 nm the value of the formula (APR/wt % EtOH)*LRP is higher than 60.0, including from 70.0-100.0.

In further embodiments, when the APR is higher than 100 nm the value of the formula (APR/wt % EtOH)*LRP is higher than 220.0, higher than 230.0 and from 250.0-500.0.

In additional embodiments, the weight percentage of ethanol with respect to the total weight of the precursor ranges from 10-60% by weight, from 15-50% by weight and from 15-40% by weight.

The solid catalyst precursor described herein can be obtained according to the following method. In a first step, $MgCl_2$ and ethanol are contacted, heated to or above the melting temperature of the $MgCl_2$-alcohol adduct for a time sufficient to obtain a completely melted adduct. In some embodiments, the adduct is maintained at a temperature equal to or higher than its melting temperature, under stirring conditions, for a time period equal to or greater than 2 hours, such as from 2-50 hours and from 5-40 hours.

The resulting molten adduct may then be emulsified in a liquid medium which is immiscible with and chemically inert to the liquid medium and finally quenched by contacting the adduct with an inert cooling liquid for solidifying the adduct. In further embodiments, one may leave the solid particles in the cooling liquid at a temperature ranging from −10-25° C. for a time ranging from 1-24 hours before collection. Due to the characteristics of the process described herein, the composition of the final adduct may substantially correspond to the feeding composition.

The emulsifying liquid medium can be any liquid immiscible with and chemically inert to the molten adduct. For example, aliphatic, aromatic and cycloaliphatic hydrocarbons and silicone oils can be used. In some embodiments, aliphatic hydrocarbons such as vaseline oil may be used.

The quenching liquid may be selected from hydrocarbons that are liquids at temperatures ranging from −30-30° C., including pentane, hexane, heptane and mixtures thereof.

In some embodiments, the magnesium dichloride particles are dispersed in an inert liquid immiscible with and chemically inert to the molten adduct, heated at temperature equal to or higher than the melting temperature necessary for forming the adduct and combined with a suitable amount of an ethanol/water mixture in the vapor phase. A temperature suitable for completely melting the adduct is maintained, with molten form of the particles again treated using the process described above.

In some embodiments, the liquid in which the $MgCl_2$ is dispersed is the same type of emulsifying liquid as described above.

In another embodiment, the resulting molten adduct is solidified into discrete particles by spray cooling, in which the solution is sprayed by a nozzle in a cold atmosphere for rapid solidification of the particles.

The mercury porosity of the resulting solid adducts typically ranges from 0.05 to 0.12 cm$^3$/g.

The mercury porosity can be increased by a dealcoholation step carried out according to known methodologies such as those described in EP Pat. Doc. 395083 in which dealcoholation occurs by keeping the adduct particles in an open cycle fluidized bed created by the flow of warm nitrogen which, after removal of the alcohol from the adduct particles, is directed out of the system. In this open cycle treatment, the dealcoholation is carried out in an increasing temperature gradient until the particles have reached the desired alcohol content, e.g. at least 10% (molar amount) lower than the initial concentration of alcohol, including 10-90% lower than the initial concentration of alcohol.

Once an acceptable value of dealcoholation has been reached, the particles may be subject to a further treatment step characterized by isothermal conditions comprising a warm nitrogen flow, wherein the adduct particles are continuously recirculated in the reactor. The process can be carried out in a fluidized bed apparatus where the bed of fluidized particles is confined at a defined height in the reactor. Alternatively, the process can be carried out in in a loop reactor apparatus comprising two interconnected zones, one of which is a densified zone in which the particles flow downward in a densified form via gravity and the other is a fast fluidization zone where the particles flow upwards under fast fluidization conditions. The state of fast fluidization is obtained when the velocity of the nitrogen fluidizing gas is higher than the transport velocity. In the densified zone, where the particles flow in a densified form under the action of gravity, high values of density of the solid are reached (where the density of the solid equals the kilograms (kg) of solid particles per cubic meter (m$^3$) of reactor occupied), which approach the bulk density of the adduct. A positive gain in pressure can be obtained along the direction of flow, so that it becomes possible to reintroduce the solid particles into the fast fluidization zone without the help of special mechanical means. In this way, a "loop" circulation is set up, which is defined by the balance of pressures between the two zones of the reactor. Generally, the adduct particles and the alcohol containing nitrogen leaving the fast fluidization zone are conveyed to a solid/gas separation zone. The solid/gas separation can be achieved by using conventional separation means such as, for example, a separator of the inertial type, of the centrifugal type, or a combination of the two.

From the separation zone, the adduct particles may enter the densified zone while the ethanol containing nitrogen stream leaving the separation zone is compressed and transferred via a recycle line (equipped with compressing means) to the bottom part of the fast fluidization zone. In some embodiments, the ethanol containing nitrogen stream can be transferred to a zone connecting the densified zone and the fast fluidization zone in order to facilitate the transfer of adduct particles from the densified to the fast fluidization zone. The adduct particles are discharged from the densified zone following their treatment.

Independently from the use of a fluidized bed reactor or a gas loop described above, the treatment is carried out in an isothermal state which can be reached according to known means such as the injection of fluid at the proper temperature in the apparatus jacket. As the treatment is isothermal and the nitrogen is continuously recycled without separating the alcohol contained in it, an equilibrium condition is reached between the vapor tension of the adduct particles and the ethanol containing nitrogen gas phase, which becomes saturated with alcohol. In some embodiments, the temperature at which the treatment is carried out ranges from 50-150° C., such as from 70-120° C. Temperatures in the upper part of the range may be chosen for adducts with relatively low amount of alcohol, while temperatures in the lower part of the range may be chosen for relatively high alcohol concentrations. This isothermal treatment stage may last from 1-60 hours, such as from 2-40 hours and from 3-30 hours and can be applied to any adduct batch coming from the open cycle dealcoholation step described above.

At the end of the isothermal treatment time the circulating nitrogen and the adduct particle are cooled to room temperature (about 20-25° C.) so that the vapor tension of the adduct is lowered and the alcohol present in the gas phase gradually returns to the adduct particles. This process makes it possible to collect the adduct particles having, at the end of the treatment, an alcohol concentration that is substantially unchanged with respect to the alcohol concentration before the treatment, for instance a decrease in alcohol concentration of 5% or less.

In some embodiments, the isothermal treatment stage does not substantially alter the level of total porosity of the adduct particles, leading instead to an increase of the average pore radius (APR) and of the porosity fraction deriving from large radius pores (LRP).

The particles collected at the end of the treatment, upon reaction with transition metal compounds, comprise catalyst components suitable for the polymerization of olefins.

In some embodiments, transition metal compounds for use in the present technology include titanium compounds of the general formula $Ti(OR)_nX_{y-n}$, where n is between 0 and y; y is the valence state of titanium; X is chlorine and R is a hydrocarbon radical, such as an alkyl radical having 1-10 carbon atoms or a COR group. Examples of titanium compounds for use in the present technology include titanium compounds having at least one Ti—Cl bond such as titanium tetrachlorides and chloroalcoholates including $TiCl_3$, $TiCl_4$, $Ti(OBu)_4$, $Ti(OBu)Cl_3$, $Ti(OBu)_2Cl_2$, $Ti(OBu)_3Cl$. In some embodiments, the reaction is carried out by suspending the adduct in cold $TiCl_4$ (at about 0° C.); the resulting mixture is heated to 80-130° C. and kept at this temperature for 0.5-2 hours. The excess of TiCl$_4$ is removed and the solid component is recovered. The treatment with TiCl$_4$ can be carried out one or more times.

The reaction between the transition metal compound and the adduct can also be carried out in the presence of an electron donor compound (internal donor), for example during the preparation of a stereospecific catalyst for the polymerization of olefins. In certain embodiments, the electron donor is selected from the group consisting of esters, ethers, amines, silanes and ketones. In further embodiments, the alkyl and aryl esters of mono- and polycarboxylic acids, for example esters of benzoic, phthalic, malonic and succinic acid, may be used. Examples of esters for use in the present technology include n-butylphthalate, di-isobutyl-phthalate, di-n-octylphthalate, diethyl 2,2-diisopropylsuccinate, diethyl 2,2-dicyclohexyl-succinate, ethyl-benzoate and p-ethoxy ethyl-benzoate. Additionally, 1,3 diethers of the general formula:

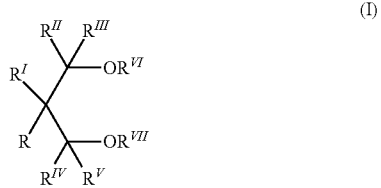

(I)

wherein R, R$^I$, R$^{II}$, R$^{III}$, R$^{IV}$ and R$^V$ equal or different to each other, are hydrogen or hydrocarbon radicals having from 1 to 18 carbon atoms, and R$^{VI}$ and R$^{VII}$, equal or different from each other, have the same meaning of R—R$^V$ except that they cannot be hydrogen; one or more of the R—R$^{VII}$ groups can be linked to form a cycle. The 1,3-diethers in which R$^{VI}$ and R$^{VII}$ are selected from C$_1$-C$_4$ alkyl radicals, may be used. The diolesters donors disclosed in U.S. Pat. No. 7,388,061 may also be utilized.

In some embodiments, the electron donor compound is present at a molar ratio with respect to the magnesium of 1:4-1:20.

In one embodiment, the particles of the solid catalyst components comprise the embodiments of the solid adducts illustrated above, including a substantially spherical morphology and an average diameter of 5-150 μm.

The catalyst components comprising the reaction product of a transition metal compound with the precursor of the present disclosure are unexpectedly capable of producing polymers having higher porosity (lower bulk density) as compared to the catalyst components prepared from the precursor not having the combination of embodiments disclosed herein.

The catalyst components of the present disclosure form catalysts for the polymerization of alpha-olefins of the general formula CH$_2$=CHR, wherein R is hydrogen or a hydrocarbon radical having 1-12 carbon atoms, by reaction with Al-alkyl compounds. The alkyl-Al compound may be chosen from among the trialkyl aluminum compounds such as triethylaluminum, triisobutylaluminum, tri-n-butylaluminum, tri-n-hexylaluminum and tri-n-octylaluminum. It is also possible to use alkylaluminum halides, alkylaluminum hydrides and alkylaluminum sesquichlorides such as AlEt$_2$Cl and Al$_2$Et$_3$Cl$_3$, optionally in mixture with trialkyl aluminum compounds.

In some embodiments, the Al/Ti ratio is higher than 1, including from 20-2000.

In the case of the stereoregular polymerization of α-olefins, such as propylene and 1-butene, an electron donor compound (external donor) which can be the same or different from the compound used as the internal donor can be used in the preparation of the catalysts disclosed above. If the internal donor is an ester of a polycarboxylic acid, for example a phthalate, the external donor may be selected from the silicon compounds containing at least an Si—OR link having the general formula R$_a^1$R$_b^2$Si(OR$^3$)$_c$, where a and b are integers from 0-2, c is an integer from 1-3 and the sum of (a+b+c) is 4; and R$^1$, R$^2$, and R$^3$, are alkyl, cycloalkyl or aryl radicals with 1-18 carbon atoms. In some embodiments, silicon compounds in which a is 1, b is 1, c is 2, at least one of R$^1$ and R$^2$ is selected from branched alkyl, cycloalkyl and aryl groups with 3-10 carbon atoms and R$^3$ is a C$_1$-C$_{10}$ alkyl group, such as a methyl group, are used. Examples of silicon compounds for use in the present technology are methylcyclohexyldimethoxysilane, diphenyldimethoxysilane, methyl-t-butyldimethoxysilane and dicyclopentyldimethoxysilane. Moreover, silicon compounds in which a is 0, c is 3, R$^2$ is a branched alkyl or cycloalkyl group and R$^3$ is methyl may be used. Examples of such silicon compounds are cyclohexyltrimethoxysilane, t-butyltrimethoxysilane and thexyltrimethoxysilane.

The 1,3 diethers having the above described formula can be used as external donors. However, in some embodiments where 1,3-diethers are used as internal donors, the use of an external donor can be avoided, in part due to the stereospecificity of the catalyst being sufficiently high.

The components of the present disclosure and catalysts obtained therefrom may be used in processes for the (co) polymerization of olefins of the general formula CH$_2$=CHR, in which R is hydrogen or a hydrocarbon radical having 1-12 carbon atoms.

The catalysts of the present disclosure can be used in any known olefin polymerization process, including slurry polymerization using an inert hydrocarbon solvent as a diluent or bulk polymerization using a liquid monomer (for example propylene) as a reaction medium. Moreover, the catalysts can also be used in the polymerization process carried out in gas-phase operating in one or more fluidized or mechanically agitated bed reactors.

Polymerizations in accordance with the present disclosure may be performed at temperatures of 20-120° C., such as from 40-80° C. When the polymerization is carried out in gas phase, the operating pressure may be from 0.1-10 MPa, such as from 1-5 MPa. In some embodiments involving bulk polymerization, the operating pressure may be from 1-6 MPa, including from 1.5-4 MPa.

The catalysts of the present disclosure are very useful for preparing a broad range of polyolefin products. Examples of the olefinic polymers which can be prepared include high density ethylene polymers (HDPE), having a density higher than 0.940 g/cc and comprising ethylene homopolymers and copolymers of ethylene with alpha-olefins having 3-12 carbon atoms. In addition, linear low density polyethylenes (LLDPE) having a density lower than 0.940 g/cc and very low density, and very-low/ultra-low density (VLDPE and ULDPE), having a density from 0.880-0.920 g/cc) consisting of copolymers of ethylene with one or more alpha-olefins having from 3 to 12 carbon atoms, having a mole content of units derived from the ethylene higher than 80% may be produced. The catalysts disclosed herein may also be used to produce isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised from 1-40% by weight, as well as heterophasic copolymers comprising a crystalline polypropylene matrix and an amorphous phase comprising copolymers of propylene with ethylene and or other alpha-olefins.

The following examples are given to illustrate certain embodiments and not to limit the present disclosure.

CHARACTERIZATION

Porosity and surface area with nitrogen: are determined according to the B.E.T. method (apparatus used SORPTOMATIC 1900 by Carlo Erba).

Porosity and Surface Area with Mercury:

The measure is carried out using a "Pascal 240" series porosimeter by Carlo Erba.

The porosity is determined by intrusion of mercury under pressure. For this determination use is made of a calibrated dilatometer (capillary diameter 3 mm) CD3P (by Carlo Erba) connected to a reservoir of mercury and to a high-vacuum pump. A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material.

The porosity (cm$^3$/g) (for supports and catalysts only deriving from pores up to 1000 nm and for polymer up to 10000 nm) and the pore distribution curve, are directly calculated from the integral pore distribution curve, which is function of the volume reduction of the mercury and applied pressure values (all these data are provided and elaborated by the porosimeter associated computer which is equipped with a dedicated Pascal software supplied by C. Erba.

The average pore size is determined as the weighted average by the pore distribution curve and it calculated summing up all the values obtained by multiplying the relative volume (%) of each pore fraction in the range 0-1000 nm of the curve by the average pore radius of the said fraction and dividing by 100 the so obtained sum.

EXAMPLES

General Procedure for the Preparation of the Catalyst Component

Into a 1 liter (L) steel reactor equipped with stirrer, 500 cm$^3$ of TiCl$_4$ at 0° C. were introduced at room temperature. 30 g of the adduct were introduced under stirring together with an amount of diisobutylphthalate as internal donor so as to give a Mg/donor molar ratio of 8. The solution was heated to 100° C. over 90 minutes and maintained at 100° C. for 60 minutes. The stirring was stopped and after 15 minutes the liquid phase was separated from the precipitated solid, while maintaining the temperature at 100° C. A further treatment of the solid was carried out by adding 500 cm$^3$ of TiCl$_4$ and heating the mixture at 110° C. over 10 minutes and maintaining these conditions for 30 minutes under stirring (500 rpm). The stirring was then discontinued and after 30 minutes the liquid phase was separated from the precipitated solid, while maintaining the temperature at 110° C. Two further treatments of the solid were carried out by adding 500 cm$^3$ of TiCl$_4$ and heating the mixture at 120° C. over 10 minutes and maintaining these conditions for 30 minutes under stirring (500 rpm). The stirring was then discontinued and after 30 minutes the liquid phase was separated from the precipitated solid, while maintaining the temperature at 120° C. Thereafter, 3 washings with 500 cm$^3$ of anhydrous hexane at 60° C. and 3 washings with 500 cm$^3$ of anhydrous hexane at room temperature were carried out. The resulting solid catalyst component was dried under vacuum in a nitrogen environment at a temperature ranging from 40-45° C.

General Procedure for the Propylene Polymerization Test.

A 4 L steel autoclave equipped with a stirrer, pressure gauge, thermometer, catalyst feeding system, monomer feeding lines and thermostatic jacket was used. The reactor was charged with 0.01 g. of solid catalyst component, 0.76 g of triethyl aluminum (TEAL), 0.06 g of cyclohexylmethyldimethoxysilane, 3.2 L of propylene and 2.0 L of hydrogen. The system was heated to 70° C. over 10 minutes under stirring and maintained under these conditions for 120 minutes. At the end of the polymerization, the polymer was recovered by removing any unreacted monomers and dried under vacuum.

A different general procedure was used for Comparative Example 1, including a different amount of catalyst (0.025 g), electron donor (0.3 g of cyclohexylmethyldimethoxysilane), and 1.25 l of hydrogen.

Also, for Examples 2-3 and Comparative Example 2 a different amount of electron donor (0.315 g of cyclohexylmethyldimethoxysilane) and hydrogen (1.25 L) were used.

Example 1 and Comparative Example 1

In a vessel reactor equipped with an IKA RE 166 stirrer containing 1030 g (1.030 kg) of anhydrous EtOH at −8° C. were introduced 550 g of MgCl$_2$ and 16 g of water under stirring conditions. Once the addition of MgCl$_2$ was completed, the temperature was raised to 108° C. and kept at this value for 20 hrs. After that, while keeping the temperature at 108° C., the melt was fed by a volumetric pump set to 62 ml/min together with OB55 oil fed by volumetric pump set to 225 ml/min using an emulsification unit operating at 2800 rpm and producing an emulsion of the melt into the oil. While the melt and oil were fed continuously, the mixture was at a temperature of about 108° C. and was continuously discharged into a vessel containing 22 L of cold hexane, which was kept under stirring and cooled so that the final temperature did not exceed 12° C. After 24 hours, the solid particles of the recovered adduct were washed with hexane and dried at 40° C. under vacuum. The compositional analysis showed that the particles contained 61.5% by weight of ethanol (EtOH), 1.45% of water and the remaining balance was MgCl$_2$.

The adduct was then thermally dealcoholated under an increasing temperature nitrogen flow until the content of EtOH reached a chemical composition of 36.2% EtOH, 1.9% H$_2$O, a porosity deriving from pores up to 1000 nm of 0.595 cm$^3$/g and an average pore radius of 183.2 nm. The fraction of porosity deriving from pores of radius ranging from 100-1000 nm (LRP) was 36.3% with respect to total porosity.

The partially dealcoholated adduct particles were fed into the cavitated zone of a Loedige apparatus placed after the fast fluidization zone and before the densified zone of a gas-phase circulating loop reactor. In the fast fluidization zone the particles are transported upwards by the high velocity of the flowing nitrogen, and in the densified zone the particles flow downward under the action of gravity. The circulating nitrogen was maintained under a stationary isothermal state at 90° C. for 20 hrs by feeding hot water in the reactor jacket. After that time, the adduct particles were cooled to room temperature by feeding room temperature water in the jacket and then the particles were discharged. The discharged product had a chemical composition of 35.8% EtOH and 2% $H_2O$. Its total porosity was 0.589 $cm^3/g$, the LRP was raised to 74.8% and the average pore size was raised to 204.4 nm. Samples of the dealcoholated adducts before (comparative) and after the stationery isothermal treatment were used to prepare, according to the above described general procedure, the catalyst component, which was then used in a polymerization test carried out according to the procedure described above. The results are reported in Table 2.

Example 2 and Comparative Example 2

An initial amount of $MgCl_2.2.8C_2H_5OH$ adduct was prepared according to the methodology described in Example 2 of WIPO PCT Publication No. WO 1998/44009, but operating on larger scale.

The adduct was then thermally dealcoholated under increasing temperature nitrogen flow until the content of EtOH reached a chemical composition of 43.3 wt. % EtOH, with a porosity deriving from pores up to 1000 nm of 0.279 $cm^3/g$ and an average pore radius of 156 nm. The partially dealcoholated adduct was then treated at 90° C. for 3 hrs, under stationary isothermal state in a nitrogen gas circulating loop as described in Example 1. The discharged product had a chemical composition of 42% EtOH. Its total porosity was 0.30 $cm^3/g$, the fraction of porosity deriving from pores with radius ranging from 100-1000 nm (LRP) was 80.2% with respect to total porosity and the average pore radius was 224.4 nm.

Then, a sample of the isothermally treated adduct and a sample of the adduct not subject to isothermal treatment were used to prepare, according to the general procedure, the catalyst components which were then used in a polymerization test carried out according to the procedure described above. The results are reported in Table 1.

Example 3

An initial amount of $MgCl_2.2.8C_2H_5OH$ adduct was prepared according to the methodology described in Example 2 of WIPO PCT Publication No. WO98/44009, but operating on a larger scale.

The adduct was then thermally dealcoholated under a nitrogen flow of increasing temperature until the content of EtOH reached a chemical composition of 42.3% EtOH, with a porosity deriving from pores up to 1000 nm of 0.230 $cm^3/g$ and an average pore radius of 137.5 nm. The fraction of porosity deriving from pores with a radius ranging from 100 to 1000 nm (LRP) was 51.7% with respect to the total porosity.

The partially dealcoholated adduct was then treated at 90° C. for 6 hrs under a stationary isothermal state in a nitrogen gas circulating loop as described in Example 1. The discharged product had a chemical composition of 42.3% EtOH. Its total porosity was 0.23 $cm^3/g$, the fraction of porosity deriving from pores with radius ranged from 100-1000 nm (LRP) increased to 77.6% with respect to total porosity, and the average pore radius was 204.2 nm.

A sample of the isothermally treated adduct was used to prepare the catalyst component, which was then used in a polymerization test carried out according to the procedure described above. The results are reported in Table 1.

Example 4-5 and Comparative 3

An initial amount of $MgCl_2.C_2H_5OH$ adduct containing 55.6% by wt. of alcohol was prepared according to the methodology described in Example 2 of WIPO PCT Publication No. WO 1998/44009, but operating on larger scale.

The adduct was then thermally dealcoholated under increasing temperature nitrogen flow until the content of EtOH reached a chemical composition of 43.0% EtOH, with a porosity deriving from pores up to 1000 nm of 0.232 $cm^3/g$ and an average pore radius of 79.1 nm. The fraction of porosity deriving from pores with radius ranging from 100-1000 nm (LRP) was 24.0% with respect to total porosity.

The partially dealcoholated adduct was then treated at 90° C. for 8 hrs under a stationary isothermal state in a nitrogen gas circulating loop as described in Example 1. The discharged product (A1) contained 42.7% EtOH. Its total porosity was 0.196 $cm^3/g$, the fraction of porosity deriving from pores with radius ranging from 100-1000 nm (LRP) increased to 66.6% with respect to total porosity, and the average pore radius was 151.5 nm.

An addition aliquot of partially dealcoholated adduct was then treated at 78° C. for 8 hr under a stationary isothermal state in a nitrogen gas circulating loop as described in Example 1. The discharged product (A2) comprised 43.0% EtOH. Its total porosity was 0.22 $cm^3/g$, the fraction of porosity deriving from pores with radii ranging from 100-1000 nm (LRP) increased to 35.8% with respect to total porosity and the average pore radius increased to 95.9 nm.

Samples of the dealcoholated adducts before (comparative) and after the stationery isothermal treatment were used to prepare, according to the general procedure, the catalyst component, which was then used in a polymerization test carried out according to the procedure described above. The results are reported in Table 1.

Example 6-7 and Comparative Example 4

An initial amount of $MgCl_2.C_2H_5OH$ adduct comprising 55.6% wt. of alcohol was prepared according to the methodology described in Example 2 of WIPO Pat. App. Pub. No. WO 1998/44009, but on larger scale.

The adduct was then thermally dealcoholated under increasing temperature nitrogen flow until the content of EtOH reached a chemical composition of 37.4% EtOH, with a porosity deriving from pores up to 1 µm of 0.338 $cm^3/g$ and an average pore radius of 129.6 nm. The fraction of porosity deriving from pores with radii ranging from 100-1000 nm (LRP) was 42.6% with respect to the total porosity.

A sample of the partially dealcoholated adduct was then thermally treated at 100° C. for 8 hr under a stationary isothermal state in a nitrogen gas circulating loop as described in Example 1. The discharged product (B1) comprised 36.2% EtOH. Its total porosity was 0.338 $cm^3/g$, the fraction of porosity deriving from pores with radii ranging from 100-1000 nm (LRP) increased to 52.5% with respect to total porosity and the average pore radius increased to 151.9 nm.

An additional aliquot of partially dealcoholated adduct was then thermally treated at 110° C. for 8 hr under a stationary isothermal state in a nitrogen gas circulating loop as described in Example 1. The discharged product (B2) comprised 36.6% EtOH. Its total porosity was 0.355 $cm^3/g$, the fraction of porosity deriving from pores with radius ranging from 100-1000 nm (LRP) increased to 63.48% with respect to total porosity and the average pore radius increased to 154.2 nm.

Samples of the dealcoholated adducts before (comparative) and after the said stationery isothermal treatment were used to prepare, according to the general procedure, the catalyst component which was then used in a polymerization test carried out according to the procedure described above. The results are reported in Table 1.

TABLE 1

| Example | Activity Kg/gcat | I.I. | Polymer Porosity (cm³/g) | Polymer bulk Density |
|---|---|---|---|---|
| 1 | 10.7 | 96.1 | | 0.34 |
| Comp.1 | 15.3 | 96.3 | | 0.37 |
| 2 | 16 | 97.4 | | 0.33 |
| Comp.2 | 20 | 97.5 | | 0.41 |
| 3 | 20.1 | 97.1 | | 0.38 |
| 4 | 30.3 | 98.2 | 0.25 | 0.41 |
| 5 | 33.6 | 97.8 | 0.23 | 0.40 |
| Comp 3 | 32.4 | 97.9 | 0.17 | 0.46 |
| 6 | 19.3 | 96.9 | 0.51 | 0.33 |
| 7 | 17.7 | 96.2 | 0.62 | 0.33 |
| Comp. 4 | 14 | 96.1 | 0.47 | 0.40 |

What is claimed is:

1. A solid catalyst precursor comprising magnesium chloride and ethanol comprising:
   (i) a total mercury porosity for pores with radii up to 1000 nm of at least 0.15 cm³/g;
   (ii) an average pore radius (APR) as determined by a mercury porosimeter from 20.0-300.0 nm;
   (iii) a fraction of porosity for pores of radii from 100-1000 nm (LRP) of at least 25% with respect to total porosity; and
   (iv) a value of the formula (APR/% wt EtOH)*LRP of higher than 50.0 when the APR is lower than 100 nm, and higher than 210.0 when the APR is higher than 100 nm, wherein the weight percentage of ethanol (% wt EtOH) and LRP are both expressed as a fraction or as an integer.

2. The solid catalyst precursor of claim 1, wherein the total mercury porosity ranges from 0.15-0.6 cm³/g.

3. The solid catalyst precursor of claim 1, wherein the average pore radius (APR) ranges from 50.0-250.0 nm.

4. The solid catalyst precursor of claim 1, wherein the LRP fraction is at least 30% of the total porosity.

5. The solid catalyst precursor of claim 1, wherein the APR is lower than 100 nm and the value of the formula (APR/% wt EtOH)*LRP is higher than 60.0.

6. The solid catalyst precursor of claims 1, wherein the APR is higher than 100 nm and the value of the formula (APR/% wt EtOH)*LRP is higher than 220.0.

7. The solid catalyst precursor of claim 1 in which the weight percentage of ethanol with respect to the total amount of precursor ranges from 15-50% wt.

8. A process for the preparation of the solid precursor of claim 1 comprising:
   (a) forming a MgCl₂.mEtOH.nH₂O adduct, where m is from 1-6 and n is from 0.01-0.6 by contacting MgCl₂ and ethanol at a temperature equal to or greater than the melting temperature of the adduct, and maintaining the conditions to obtain a completely melted adduct;
   (b) solidifying the adduct to form discrete particles,
   (c) subjecting the particles from step (b) to a dealcholation step comprising removing at least 10% (molar amount) of the initial alcohol content; and
   (d) subjecting the particles from step (c) to an isothermal treatment stage at a temperature ranging from 50-150° C. for 1-60 hours carried under a continuously recirculating a nitrogen flow.

9. A solid catalyst components for the polymerization of olefins obtained by reacting the solid catalyst precursors of claim 1 with one or more transition metal compounds.

10. The solid catalyst components of claim 9, wherein the transition metal compound is selected from titanium compounds of the general formula $Ti(OR)_nX_{y-n}$, where n is between 0 and y; y is the valence state of titanium; X is chlorine and R is a hydrocarbon radical.

11. The solid catalyst components of claim 9, wherein the reaction between the transition metal compound and the adduct is carried out in the presence of an electron donor compound selected from esters, ethers, amines, silanes and ketones.

12. A catalyst for the polymerization of olefins comprising the product of the reaction between the catalyst component of claim 9, and an organoaluminum compound.

13. The catalyst of claim 12, further comprising an external donor.

14. The catalyst of claim 13, wherein the external donor is selected from silicon compounds containing at least an Si—OR link having the general formula $R_a^1R_b^2Si(OR^3)_c$, where a and b are integer from 0-2, c is an integer from 1-3 and the sum (a+b+c) is 4; and $R^1$, $R^2$, and $R^3$ are selected from the group consisting of alkyl, cycloalkyl and aryl radicals with 1-18 carbon atoms.

15. A process for the polymerization of olefins of the general formula CH₂=CHR, wherein R is hydrogen or a hydrocarbon radical having 1-12 carbon atoms, comprising contacting the olefins with the catalyst of claim 12.

* * * * *

UNITED STATES PATENT AND TRADEMARK OFFICE
CERTIFICATE OF CORRECTION

PATENT NO. : 9,920,144 B2
APPLICATION NO. : 15/507998
DATED : March 20, 2018
INVENTOR(S) : Arletti et al.

Page 1 of 1

It is certified that error appears in the above-identified patent and that said Letters Patent is hereby corrected as shown below:

In the Specification

In Column 3, Line 48, delete "in in" and insert -- in --.
In Column 6, Line 59, after "from" insert -- ( --.
In Column 7, Line 40, after "Erba." insert -- ) --.

In the Claims

In Column 12, Claim 7, Line 4, after "1" insert -- , --.
In Column 12, Claim 8, Line 8, after "1" insert -- , --.
In Column 12, Claim 9, Line 24, after "1" insert -- , --.

Signed and Sealed this
Eighth Day of February, 2022

Drew Hirshfeld
*Performing the Functions and Duties of the
Under Secretary of Commerce for Intellectual Property and
Director of the United States Patent and Trademark Office*